(No Model.)
O. A. WICKE & P. REINHART.
CAR FENDER.
No. 538,940. Patented May 7, 1895.
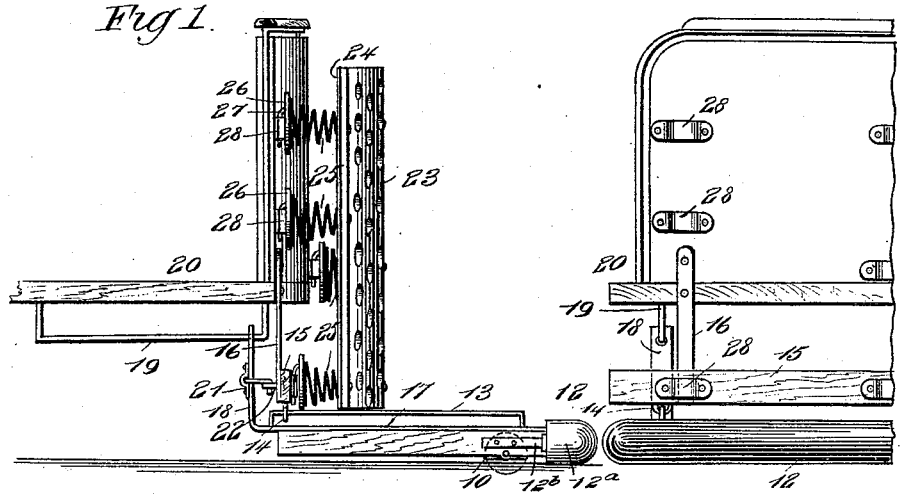
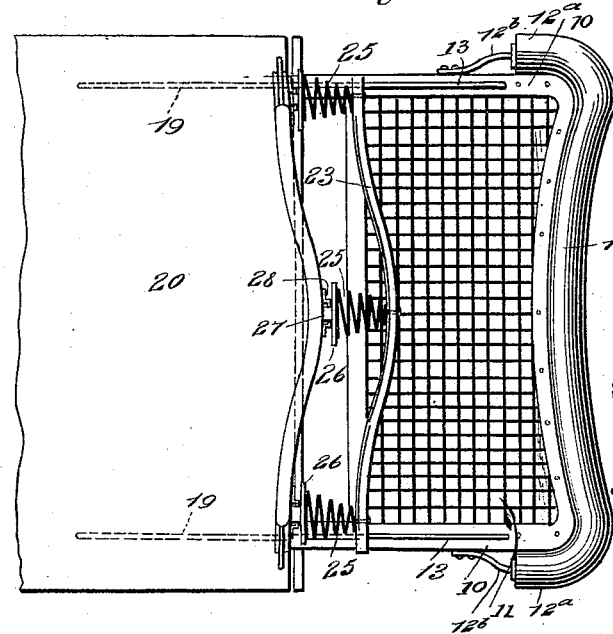
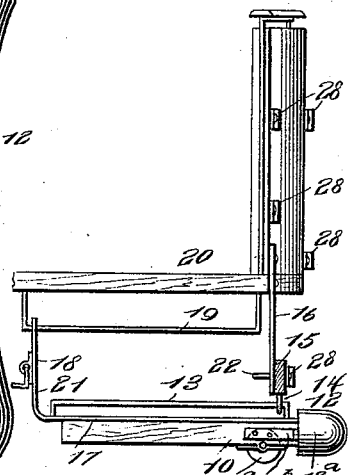

United States Patent Office.

OTTO A. WICKE AND PHILIP REINHART, OF BROOKLYN, NEW YORK.

CAR-FENDER.

SPECIFICATION forming part of Letters Patent No. 538,940, dated May 7, 1895.

Application filed October 5, 1894. Serial No. 524,959. (No model.)

*To all whom it may concern:*

Be it known that we, OTTO A. WICKE and PHILIP REINHART, of Brooklyn, in the county of Kings and State of New York, have invented a new and Improved Car-Fender, of which the following is a full, clear, and exact description.

Our invention relates to improvements in car fenders and particularly to such as are adapted for use on street cars; and the object of our invention is to produce a car fender of very simple and substantial construction, which may be easily applied to any ordinary street car, and which, when so applied, may be pushed back beneath the car out of the way, or extended forward ready for use, the fender when in the latter position, being so arranged that if it strikes a person on the track it will trip the said person and catch him and prevent him from being run over by the car, also to produce a fender which will not throw a person to one side, and further, to produce a soft spring buffer which covers the dashboard of the car and which serves as a harmless abutment for a person tripped by the fender.

To these ends our invention consists of certain features of construction and combination of parts, which will be hereinafter described and claimed.

Reference is to be had to the accompanying drawings, forming a part of this specification, in which similar figures of reference indicate corresponding parts in all the views.

Figure 1 is a side elevation of our improved apparatus as applied to a car, the fender being shown in an extended position. Fig. 2 is a broken front view of a fender as applied to a car. Fig. 3 is a plan view of the same, and Fig. 4 is a detail side elevation showing the fender pushed back beneath the car.

The fender is provided with a suitable frame 10, adapted to lie horizontally close to the track and beneath the car, as shown in Fig. 1, the frame having in opposite sides, trucks $10^a$ which turn in sockets in the frame, and by contact with the rail, prevent the frame from being to much depressed, and this frame is covered by a suitable network 11 which may be of any ordinary kind, and the front end of the frame is concave, as shown clearly in Fig. 3, and provided with a pneumatic cushion 12, which, being at the extreme front end of the frame, will strike any person standing on the track, and trip the person without injuring the limbs. The cushion 12 is bent around the front corners of the frame 10, as shown best in Fig. 3, so as to prevent the frame from striking any person, and the ends of the cushion are connected with the sides of the frame by braces $12^b$. By having the front end of the fender concave, as described, it will be seen that there is no tendency for it to throw a person to one side of the track and perhaps beneath a passing truck or another car, but this shape of the fender causes the party struck to be drawn toward the center of the fender and so caught in safety.

The frame 10 is provided at opposite sides with elongated brackets or hangers 13, which slide in supporting eyes 14 on the under side of a cross bar 15 which is hung from the end of the car by means of metallic straps 16 or other suitable hangers, and the fender ends or sides have also metallic straps 17 fastened to them, which straps are turned up at the ends to form hangers or braces 18, and these slide on elongated brackets 19 which are hung on the under side of the car 20, and this arrangement enables the fender to be pushed easily backward and forward, the brackets 13 sliding through the eyes 14, and the upturned hangers or braces 18 sliding on the brackets 19.

When the fender is pushed forward it is held in its forward position by hooks 21, which are pivoted to the braces 18 and which engage eyes 22 on the back of the cross bar 15. Just above the fender is a spring buffer 23, which is preferably, but not necessarily, of soft rubber and is perforated to make it lighter and more pliable. This buffer conforms in shape to the shape of the dashboard of the car and it is held in a vertical position and is backed by spiral springs 25, the outer ends of which are fastened securely to the buffer and the inner ends of the springs are secured to plates 26 which have hooks 27 thereon, and these hooks are adapted to engage eyes or keepers 28 on the dashboard of the car and on the cross bar 15. In this way the buffer is held securely in place, and it may be readily lifted from its eyes or keepers and transferred to the other end of the car.

It will be seen that if a person is struck by the fender he will be tripped and thrown against the buffer 23, which is so pliable and yielding that it will not hurt him, and thus the party will be safely caught and will ride on the fender until the car is stopped.

Having thus described our invention, we claim as new and desire to secure by Letters Patent—

1. The combination, with the car, the parallel brackets beneath it and the eyes suspended from the front end of the car, of the sliding fender having turned-up braces to slide on the car brackets, and brackets on the fender top to engage the eyes, substantially as described.

2. The combination of a car having a longitudinal guide way and a projection and a fender having a projection to engage the guide way on the car, and provided with a guide way parallel to the guide-way on the car and adapted to receive the projection on the car, substantially as set forth.

3. The combination of a car having a longitudinal guide way and a projection, a fender having a projection and a guide way to engage the respective guide way and projection on the car, said guide ways being parallel to one another and means for holding the projections together substantially as set forth.

4. The combination of a car having a longitudinal guide way and a projection depending below said guide way and aligned with the same at one end, and a fender having a guide way parallel to and located under the guide-way on the car and adapted to engage the projection thereon, said fender being also provided at one end with an upward projection aligned with the guide-way on the fender at one end thereof and adapted to engage the guide-way on the car, substantially as set forth.

5. The combination of a car having a longitudinal guide way and a projection depending below the guide way at one end of the same and provided with a perforation in its lower end, and a fender having a guide way aligned with the guide way on the car and adapted to engage the perforation in the lower end of the projection on the car, said fender being provided at one end of its guide way with an upward projection having a perforation at its upper end to receive the guide way on the car, substantially as set forth.

OTTO A. WICKE.
PHILIP REINHART.

Witnesses:
CUNNINGHAM FORSYTHE,
CLAUS TORNEY.